United States Patent
Spencer et al.

(10) Patent No.: US 10,071,831 B1
(45) Date of Patent: Sep. 11, 2018

(54) ICE CREAM SANDWICH CARTONER

(71) Applicant: DariFill Inc., Westerville, OH (US)

(72) Inventors: Jack Spencer, Westerville, OH (US); Eric Rousculp, Worthington, OH (US); Scott Spears, Columbus, OH (US)

(73) Assignee: Darifill, Inc., Westerville, OH (US)

( * ) Notice: Subject to any disclaimer, the term of this patent is extended or adjusted under 35 U.S.C. 154(b) by 617 days.

(21) Appl. No.: 14/531,076

(22) Filed: Nov. 3, 2014

Related U.S. Application Data

(60) Provisional application No. 61/898,550, filed on Nov. 1, 2013.

(51) Int. Cl.
  *B65B 35/32* (2006.01)
  *B65B 59/00* (2006.01)
  *B65B 59/02* (2006.01)
  *B65G 57/02* (2006.01)

(52) U.S. Cl.
  CPC ............ *B65B 59/005* (2013.01); *B65B 35/32* (2013.01); *B65B 59/02* (2013.01); *B65G 57/02* (2013.01)

(58) Field of Classification Search
  CPC ......... B65B 5/06; B65B 5/106; B65B 25/007; B65B 35/32; B65B 35/40; B65B 35/5057; B65B 57/14; B65B 57/20; B65B 65/003; B65B 65/08; B65B 2210/00; B65B 2210/10; B65B 59/005; B65G 47/26; B65G 47/32; B65G 47/74; B65G 47/94

USPC ...... 53/52, 54, 540, 251, 252, 500; 198/430, 198/468.1, 746, 369.3, 369.2, 370.04
See application file for complete search history.

(56) References Cited

U.S. PATENT DOCUMENTS

| | | | | |
|---|---|---|---|---|
| 4,173,237 A | * | 11/1979 | Heikkinen | B27L 7/00 144/195.1 |
| 4,555,010 A | * | 11/1985 | Solund | B65G 47/94 193/36 |
| 4,852,715 A | * | 8/1989 | Kmetz | B65G 47/647 198/369.2 |
| 5,042,638 A | * | 8/1991 | Price | A23G 9/286 198/430 |
| 5,078,255 A | * | 1/1992 | Haley | B65G 47/647 198/358 |
| 5,515,962 A | * | 5/1996 | Kennedy | B65B 25/007 198/430 |
| 5,720,593 A | * | 2/1998 | Pleake | A21C 15/00 209/698 |
| 8,056,304 B2 | * | 11/2011 | Brandhorst | B65B 35/54 198/417 |
| 2002/0104736 A1 | * | 8/2002 | Peppel | B65G 47/647 198/369.2 |
| 2002/0166752 A1 | * | 11/2002 | Takahashi | B65G 21/10 198/369.2 |

* cited by examiner

*Primary Examiner* — Andrew M Tecco
*Assistant Examiner* — Nicholas Igbokwe
(74) *Attorney, Agent, or Firm* — Vorys, Sater, Seymour and Pease LLP

(57) ABSTRACT

An ice cream sandwich cartoner. The cartoner is configured to continue operation while clearing a jam.

17 Claims, 24 Drawing Sheets

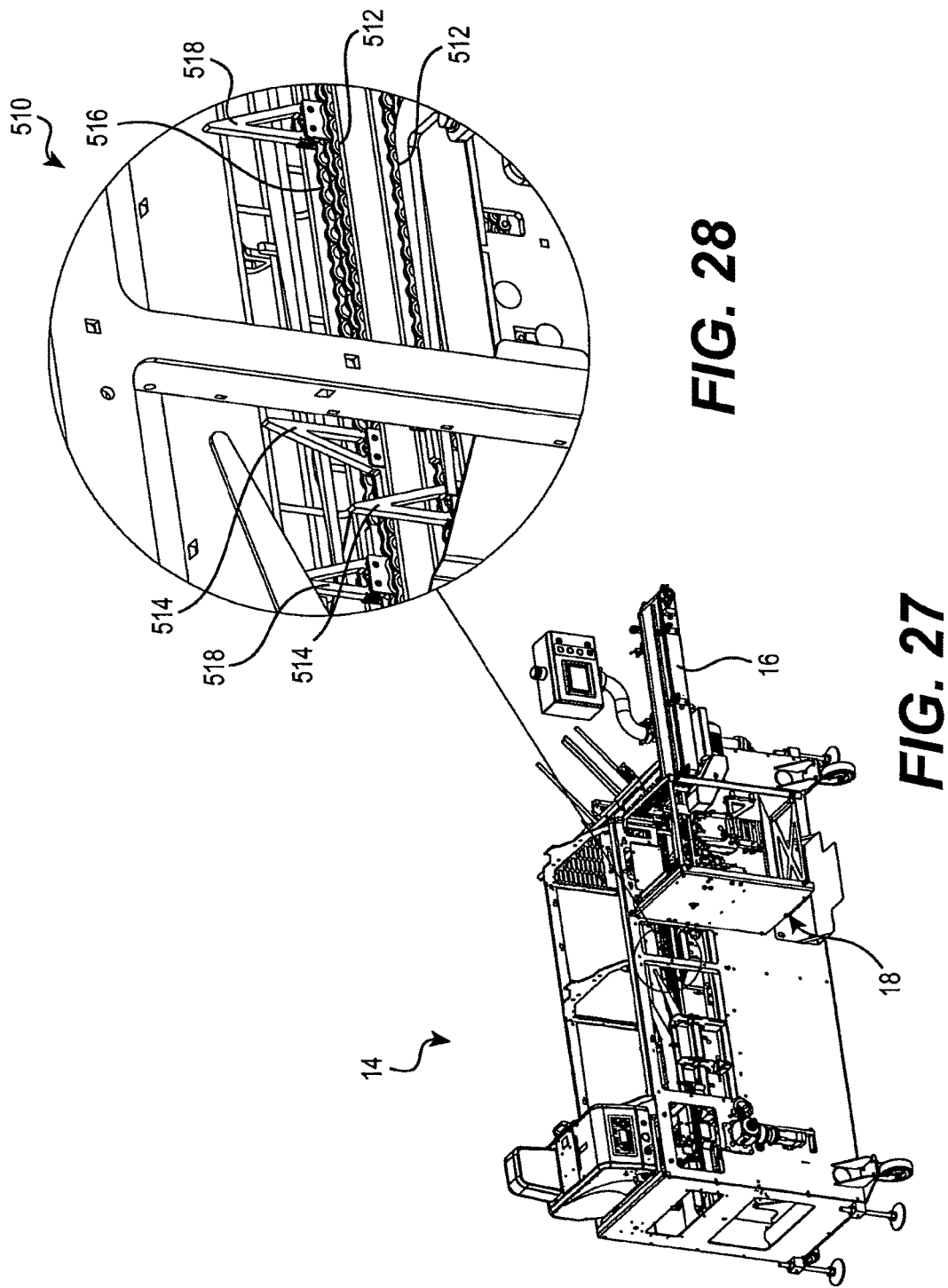

ICE CREAM SANDWICH CARTONER

RELATED APPLICATIONS

This is a non-provisional application of provisional application No. 61/898,550, filed on Nov. 1, 2013. This non-provisional application claims priority to this provisional application under 35 U.S.C. § 119(e).

FIELD

The presently described subject matter relates to a wrapped ice cream sandwich cartoner. The wrapped ice cream sandwich cartoner can include a diverter, tilting stacking elevator, and/or dual speed secondary carton load pusher for filling cartons with the wrapped ice cream sandwiches.

BACKGROUND

In the past, when filling wrapped ice cream sandwiches into cartons, if the ice cream sandwiches begin to jam up inside the cartoner then the operating ice cream machine and cartoner needed to be emergency stopped ending production. After stopping, the jammed ice cream sandwiches would be cleared to then allow restarting production.

Thus, there exists a need for an improved wrapped ice cream sandwich cartoner. In particular, there exists a need for an ice cream sandwich cartoner configured to allow the filler to remain operational while a jam is cleared in the cartoner. Specifically, the jammed ice cream sandwiches can be cleared by eliminating or reducing the need to open interlocked doors fitted with emergency stops (i.e. E stops). The opened interlocked doors disable the guarded areas.

Additionally, the cartoner speeds restarting production by automatically detecting jams and diverting ice cream sandwiches, which allow the filler to continue operation while the jam is cleared. The filler takes time to restart and increases the amount of scrap.

SUMMARY

The presently described subject matter is directed to an improved ice cream sandwich cartoner.

The presently described subject matter is directed to an ice cream sandwich cartoner comprising or consisting of a diverter configured for receiving ice cream sandwiches and diverting ice cream sandwiches.

The presently described subject matter is directed to an ice cream sandwich cartoner comprising or consisting of a collation unit, the collation unit comprising a diverter configured for receiving ice cream sandwiches and diverting ice cream sandwiches within the collation unit.

The presently described subject matter is directed to an ice cream sandwich cartoner comprising or consisting of a collation unit, the collation unit comprising a diverter configured for receiving ice cream sandwiches and diverting ice cream sandwiches within the collation unit; and a control configured to control operation of the diverter.

The presently described subject matter is directed to an ice cream sandwich cartoner comprising or consisting of a collation unit, the collation unit comprising a diverter configured for receiving ice cream sandwiches and diverting ice cream sandwiches within the collation unit, the divert comprising a dead plate.

The presently described subject matter is directed to an ice cream sandwich cartoner comprising or consisting of a collation unit, the collation unit comprising a diverter configured for receiving ice cream sandwiches and diverting ice cream sandwiches within the collation unit, the diverter comprising a tilting dead plate.

The presently described subject matter is directed to an ice cream sandwich cartoner comprising or consisting of a collation unit, the collation unit comprising a diverter configured for receiving ice cream sandwiches and diverting ice cream sandwiches within the collation unit, the diverter comprising a dead plate located between a conveyor belt configured to convey ice cream sandwiches to the cartoner and an accumulation area of the collation unit of the cartoner.

The presently described subject matter is directed to an ice cream sandwich cartoner comprising or consisting of a collation unit, the collation unit comprising a diverter configured for receiving ice cream sandwiches and diverting ice cream sandwiches within the collation unit, the diverter comprising a tilting dead plate located between a conveyor belt configured to convey ice cream sandwiches to the cartoner and an accumulation area of the collation unit of the cartoner.

The presently described subject matter is directed to an ice cream sandwich cartoner comprising or consisting of a collation unit, the collation unit comprising a diverter configured for receiving ice cream sandwiches and diverting ice cream sandwiches within the collation unit, the diverter comprising a tilting dead plate located between a conveyor belt configured to convey ice cream sandwiches to the cartoner and an accumulation area of the collation unit of the cartoner, the tilting dead plate being configured to raise an end of the tilting dead plate to divert the ice cream sandwiches away from the accumulation area of the cartoner.

The presently described subject matter is directed to an ice cream sandwich cartoner comprising or consisting of a collation unit, the collation unit comprising a diverter configured for receiving ice cream sandwiches and diverting ice cream sandwiches within the collation unit, the diverter comprising a tilting dead plate located between a conveyor belt configured to convey ice cream sandwiches to the cartoner and an accumulation area of the collation unit of the cartoner, the tilting dead plate comprising an actuator configured to raise an end of the tilting dead plate to divert the ice cream sandwiches away from the accumulation area of the cartoner The presently described subject matter is directed to an ice cream sandwich cartoner comprising or consisting of a collation unit comprising a stacking elevator configured to tilt.

The presently described subject matter is directed to an ice cream sandwich cartoner comprising or consisting of a collation unit comprising a stacking elevator configured to tilt, and a control configured to operate the tilting stacking elevator to clear a jam in the collation unit.

The presently described subject matter is directed to an ice cream sandwich cartoner comprising or consisting of a collation unit comprising a diverter and stacking elevator.

The presently described subject matter is directed to an ice cream sandwich cartoner comprising or consisting of a collation unit comprising a tilting diverter and a tilting stacking elevator.

The presently described subject matter is directed to an ice cream sandwich cartoner comprising or consisting of a collation unit comprising a diverter and stacking elevator, the diverter configured to divert ice cream sandwiches within the collation unit.

The presently described subject matter is directed to an ice cream sandwich cartoner comprising or consisting of a collation unit comprising a diverter and stacking elevator, the diverter being a tilting diverter configured to divert ice cream sandwiches within the collation unit, the stacking elevator being a tilting stacking elevator configured to tilt to clear one or more ice cream sandwiches loaded onto the tilting stacking elevator.

The presently described subject matter is directed to an ice cream sandwich cartoner comprising or consisting of a collation unit comprising a diverter and stacking elevator, the diverter being a tilting diverter configured to divert ice cream sandwiches within the collation unit, the stacking elevator being a tilting stacking elevator configured to tilt to clear one or more ice cream sandwiches loaded onto the tilting stacking elevator; and a control configured to operate the tilting stacking elevator to clear a jam in the collation unit and operate the diverter.

The presently described subject matter is directed to an ice cream sandwich making machine with an improved cartoner in combination, and the improved cartoner itself.

The improved cartoner comprises a plurality of features, including but not limited to: 1) ice cream sandwich diverter; 2) stacking elevator; 3) adjustable fence stop; 4) dual speed carton load pusher; 5) recipe driven carton flight drive arrangement; 6) telescoping carton pick arm; 7) recipe driven double-motion carton pick-arm; and 8) serrated drive lugs. The improved cartoner can comprise one or more of the above features, or various combinations of the above features. For example, the improved cartoner can consist of feature 1 above only. Alternatively, the improved cartoner can comprise features 1, 2, and 4. As a further alternative, the cartoner comprises all of the above features 1 thru 7.

The ice cream sandwich making machine (station #1) is connected to the cartoner (station #2) to make operational the production line for making and packaging wrapped ice cream sandwiches. A conveyor connects station #1 to station #2, and the conveyor can be part of the ice cream sandwich making machine, the cartoner, or a separate unit that can be connected to both the ice cream sandwich making machine and the cartoner.

The improved cartoner is arranged or configured to maintain production of the ice cream sandwich making machine and the cartoner, even when the ice cream sandwiches jam up in the cartoner. To maintain production, the feeding of wrapped ice cream sandwiches from the ice cream sandwich making machine to the cartoner must be interrupted so that ice cream sandwiches do not continue to be fed and further jam up the cartoner. Further, the improved cartoner can be configured with one or more of the above features to remove or clear the jammed ice cream sandwiches from the cartoner. For example, the collation unit of the cartoner can be configured and/or operated to clear the jammed ice cream sandwiches automatically or semi-automatically without opening the collation unit and/or emergency stopping the production line.

The cartoner can be provided with the ice cream sandwich diverter (feature #1). For example, the ice cream sandwich diverter is located in the collation unit of the cartoner.

The ice cream sandwich diverter is configured to divert the continuous flow of wrapped ice cream sandwiches being transported from the ice cream sandwich making machine to the cartoner on the conveyor. Specifically, the conveyor can be arranged to transport the wrapped ice cream sandwiches into the collation unit of the cartoner.

The ice cream sandwich diverter, for example, can be located in the collation unit of the cartoner. For example, the ice cream sandwich divert can include a tilting dead plate. For example, an input end of the tilting dead plate is tilted upwardly to allow the wrapped ice cream sandwiches to fall downwardly from the output end of the conveyor into a collection unit or receptacle.

In addition to the ice cream sandwich diverter (feature #1), or separately, the collation unit of the cartoner can be provided with the stacking elevator (feature #2). For example, the stacking elevator includes a tilting elevator pad configured to clear jammed ice cream sandwiches loaded on the elevator pad.

The cartoner can be provided with the adjustable fence stop (feature #3). For example, the adjustable fence stop can be located in the collation unit; however, outside a safety cage to provide access during production. The adjustable fence stop can be configured to allow for fine tuning of the stop position of the wrapped ice cream sandwiches when located outside of the guarded area.

The cartoner can be provided with a dual speed carton load pusher arrangement (feature #4). The dual speed secondary carton load pusher arrangement can be configured to load a first load and a then a second load of ice cream sandwiches into a double-load box. For example, the dual speed secondary carton load pusher arrangement can be configured for low speed loading of the first load into the double-load box, and then a high speed loading of the second load into the double-load box. In this manner, the first load of ice cream sandwiches are not jumbled within the double-load box prior to the second load of ice cream sandwiches being loaded.

The cartoner can be provided with the recipe driven carton flight drive arrangement (feature #5). For example, the recipe driven carton flight drive arrangement includes adjustable spacing lugs to accommodated different sized ice cream sandwich cartons, which lugs can be automatically adjusted to the size of the carton.

The cartoner can be provided with the telescoping carton pick arm (feature #6). For example, the telescoping carton pick arm includes an adjustable length arm extensions having a set of vacuum cups. This configuration allows for the use of one arm for various sized cartons.

The cartoner can be provided with a recipe driven double-motion carton pick arm (feature #7). The recipe driven double-motion carton pick arm can be configured to handle large cartons that are difficult to erect.

The cartoner can be provided with the serrated drive lugs (feature #8). The serrated drive lugs each comprise a set of teeth configured to keep a carton from moving out of placed position during index as the drive lugs advance, a carton for an erected position to a carton loading position.

BRIEF DESCRIPTION OF DRAWINGS

FIG. 27 is a front and side perspective view of the ice cream sandwich cartoner illustrating the location of the recipe driven carton flight drive lug spacing arrangement.

FIG. 28 is an exploded detailed view of the recipe driven carton flight drive lug spacing arrangement shown in FIG. 27.

DETAILED DESCRIPTION

Figure 1:
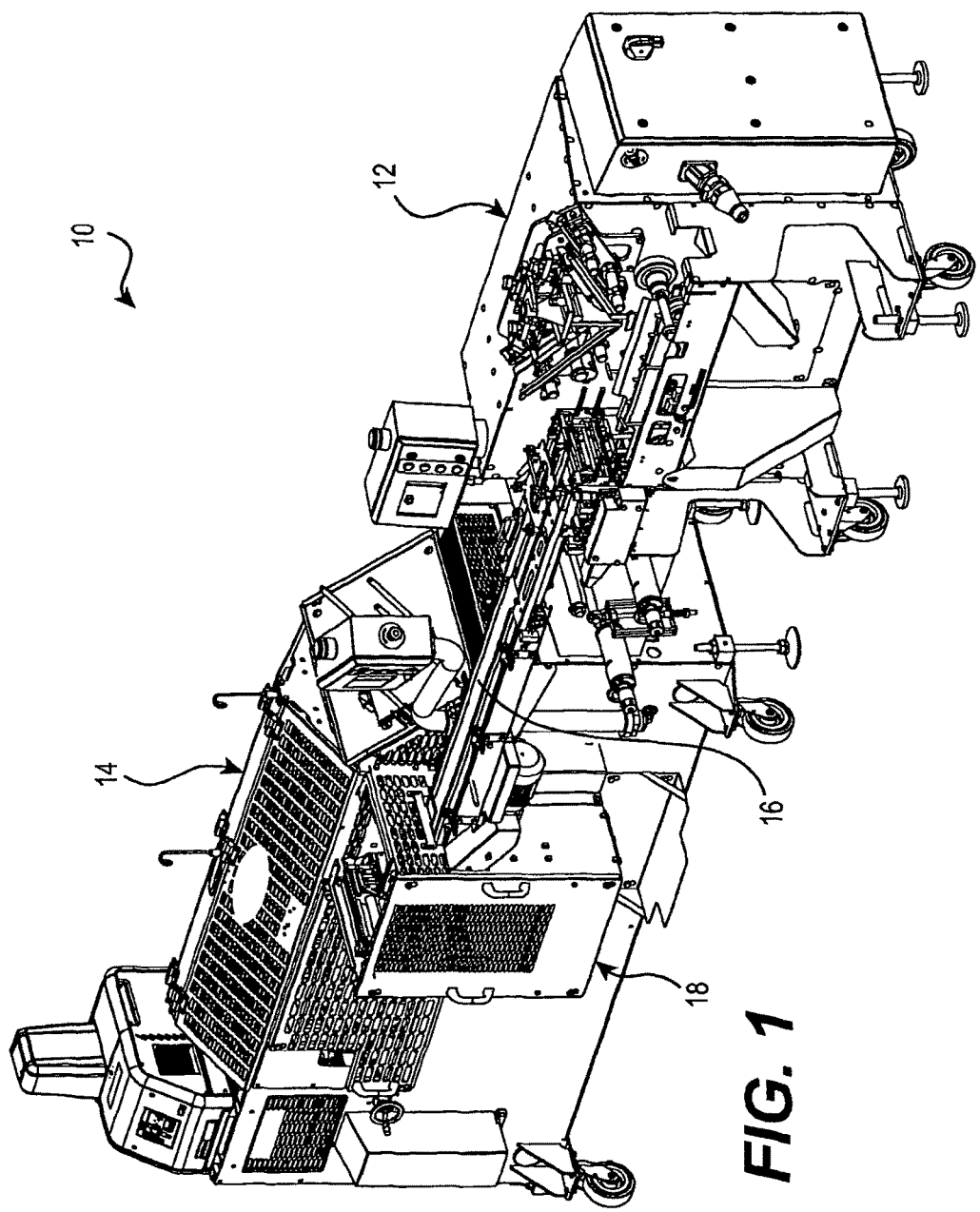
FIG. 1 is perspective view of an ice cream sandwich making machine and cartoner.
Figure 2:
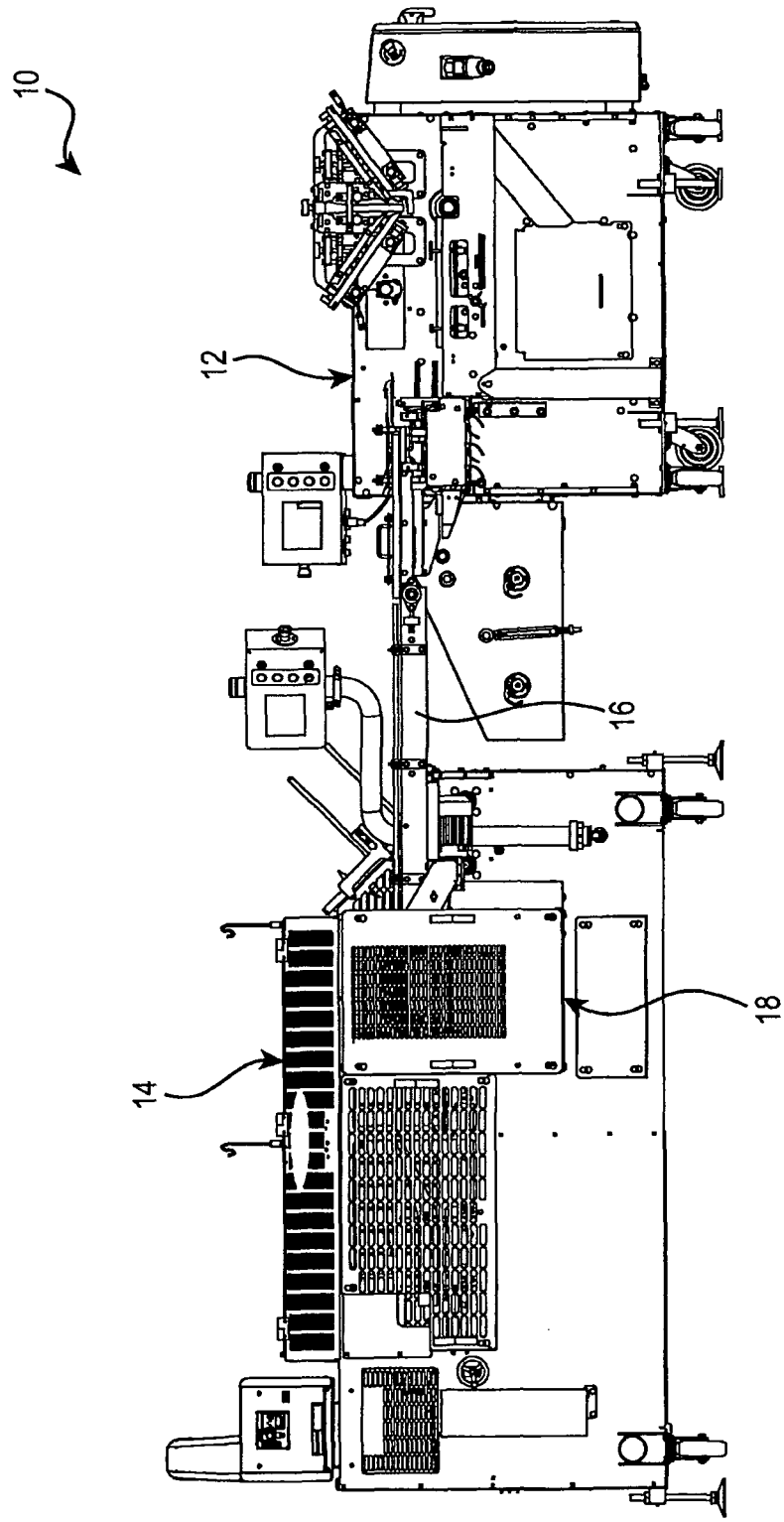
FIG. 2 is a front elevational view of the ice cream sandwich making machine and cartoner shown in FIG. 1.
Figure 3:
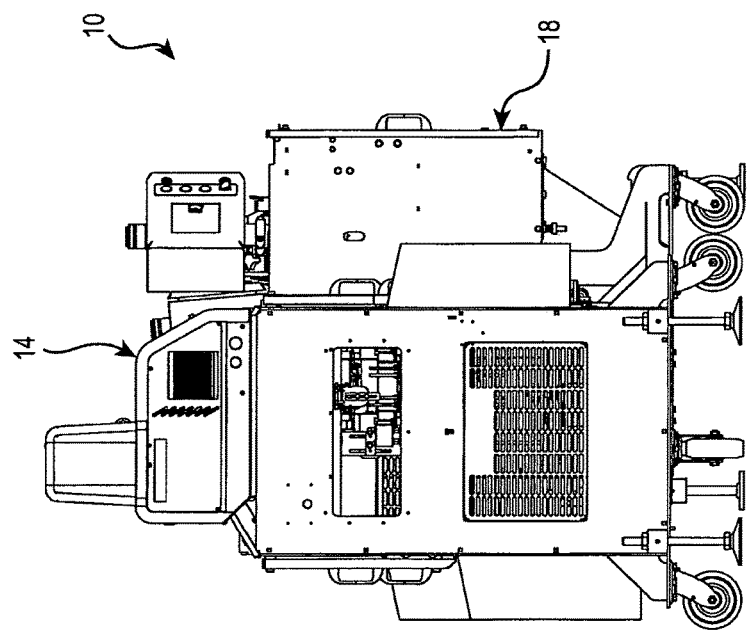
FIG. 3 is a left side elevational view of the cartoner shown in FIG. 1.
Figure 4:
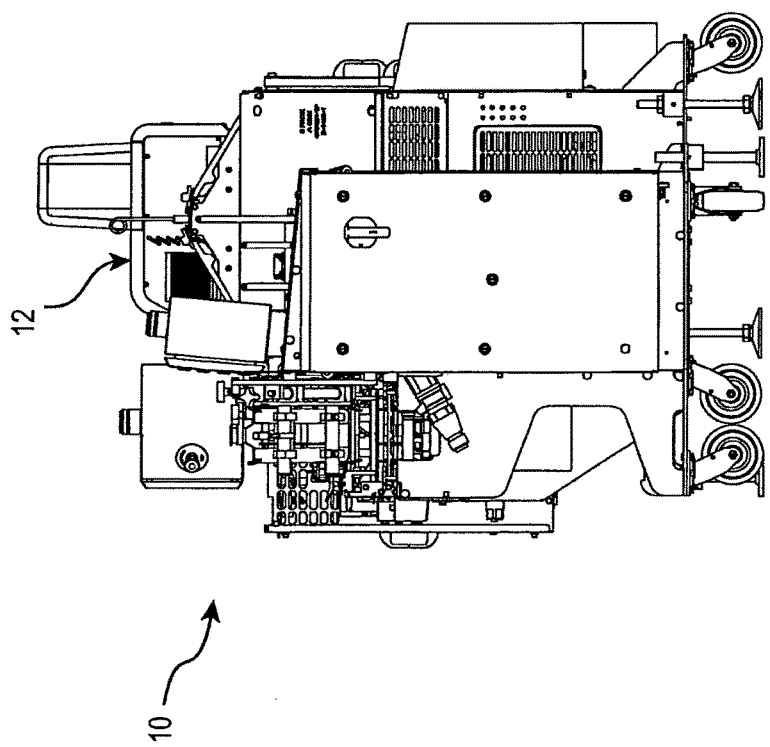
FIG. 4 is a right side elevational view of the ice cream making machine and cartoner shown in FIG. 1.
Figure 5:
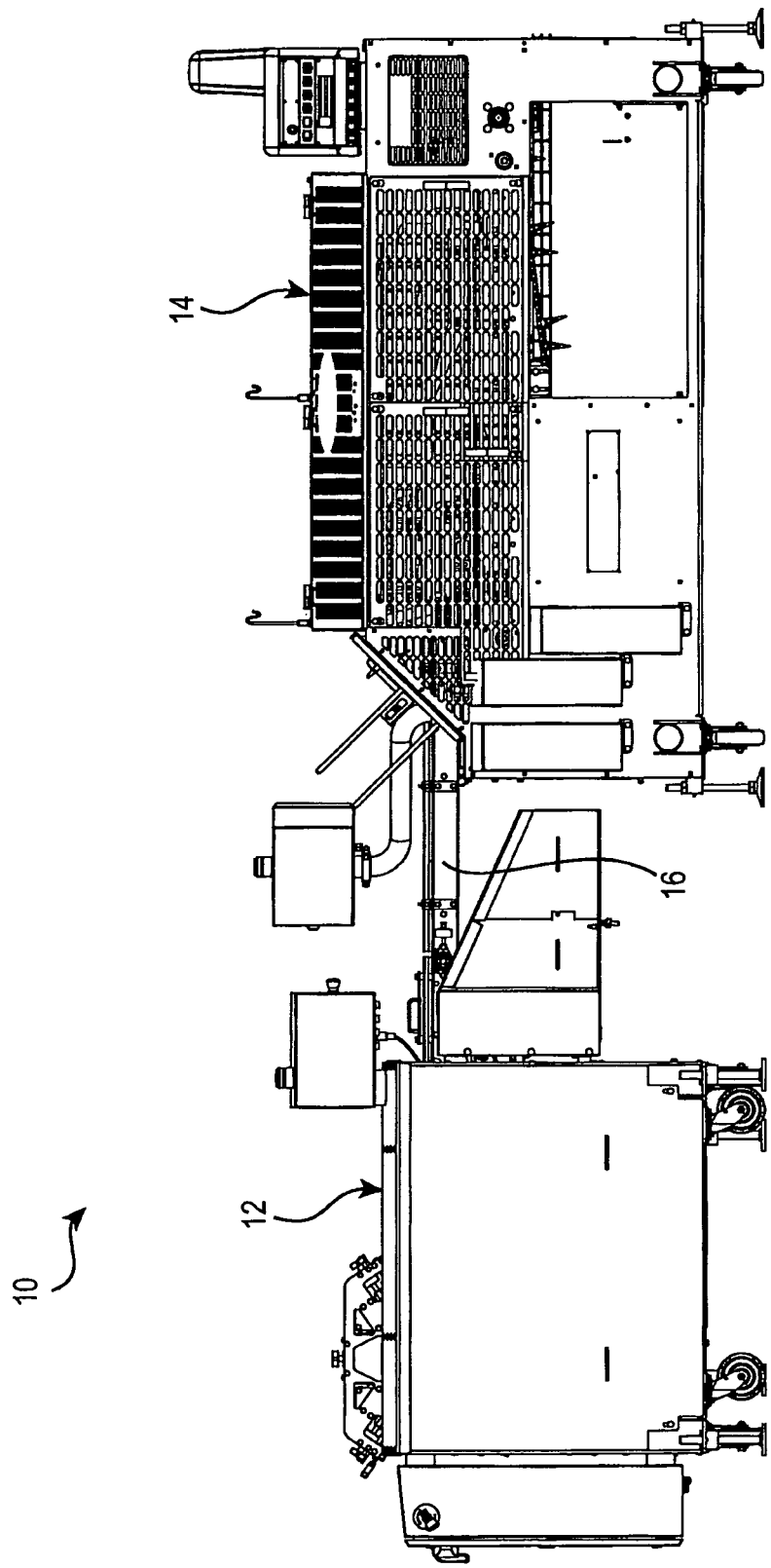
FIG. 5 is a rear elevational view of the ice cream sandwich making machine and cartoner shown in FIG. 1.
Figure 6:
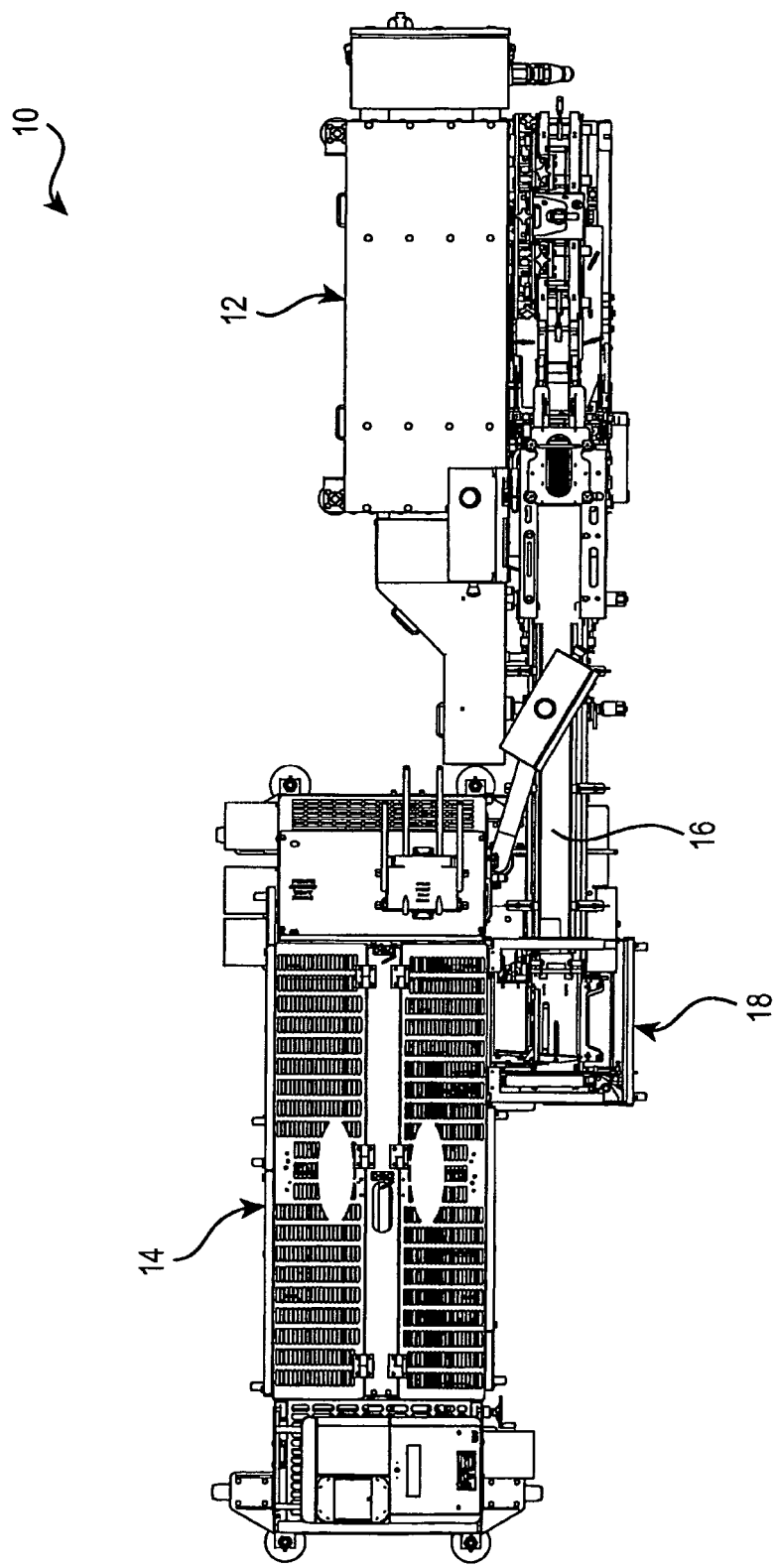
FIG. 6 is a top planar view of the ice cream sandwich making machine and cartoner shown in FIG. 1.

An ice cream sandwich machine 10 is shown in FIGS. 1-6. The ice cream sandwich machine 10 comprises an ice cream sandwich making machine 12 (Station #1) connected to an ice cream sandwich cartoner 14 (Station #2). This arrangement provides two (2) separate machines or stations to make ice cream sandwiches, wrap the ice cream sandwiches, and carton the ice cream sandwiches.

The ice cream sandwich machine 12 is configured to make an ice cream sandwich by extruding ice cream between a set of wafers, and then wrapping the ice cream sandwich. This process is repeated over and over again to make a production of ice cream sandwiches. The wrapped ice cream sandwiches are transferred along conveyor 16 from the ice cream sandwich machine 12 (Station #1) to the ice cream sandwich cartoner 14 (Station #2).

The ice cream sandwich cartoner 14 (Station #2) is shown by itself in FIGS. 7-11. The ice cream sandwich cartoner 14 comprises the following features.

Ice Cream Sandwich Diverter

Figure 7:
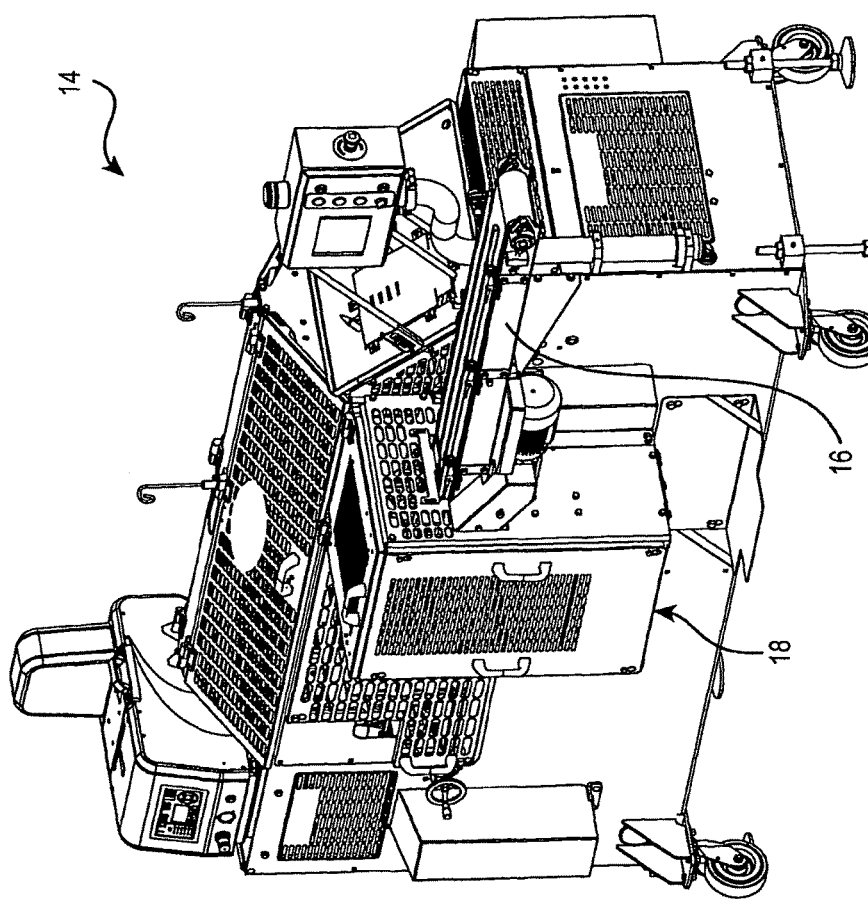
FIG. 7 is a perspective view of the ice cream sandwich cartoner shown as part of the ice cream sandwich machine shown in FIG. 1.
Figure 8:
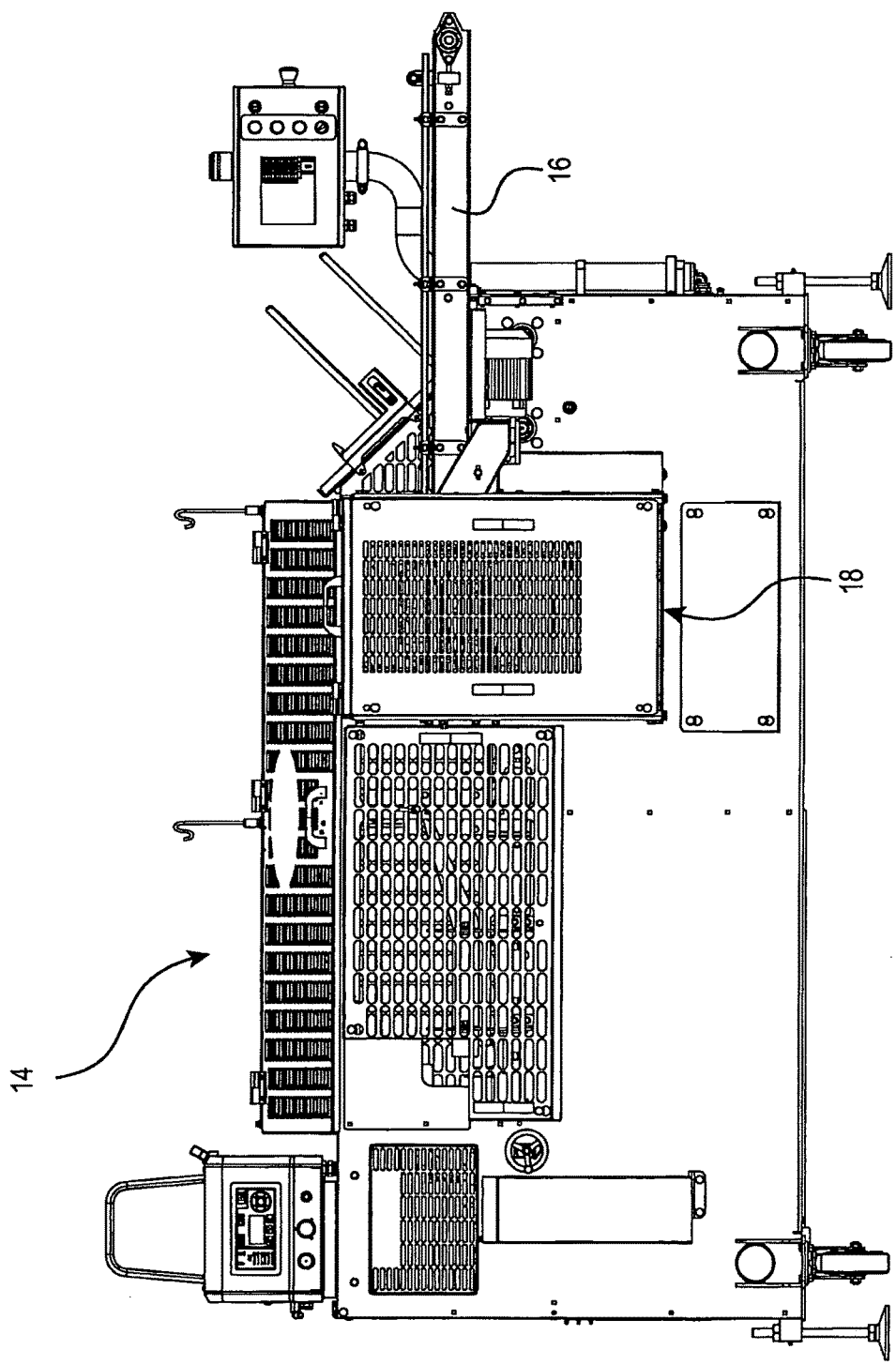
FIG. 8 is a front elevational view of the ice cream sandwich cartoner shown in FIG. 7.
Figure 9:
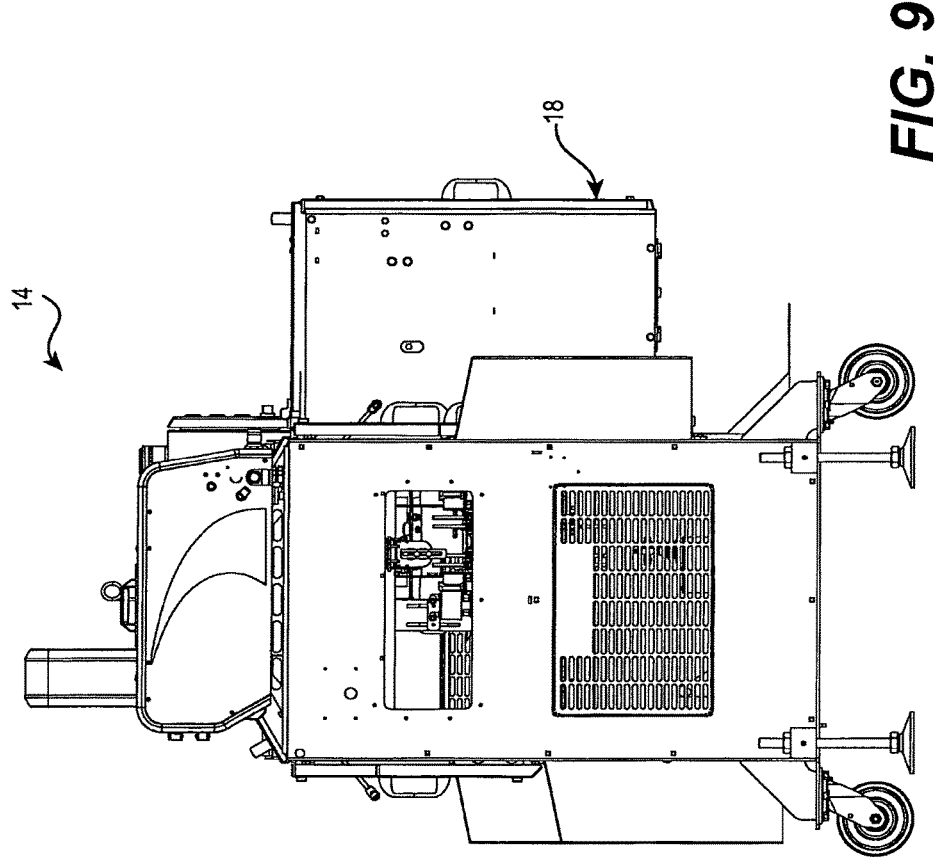
FIG. 9 is a left side elevational view of the ice cream sandwich making machine and cartoner shown in FIG. 7.
Figure 10:
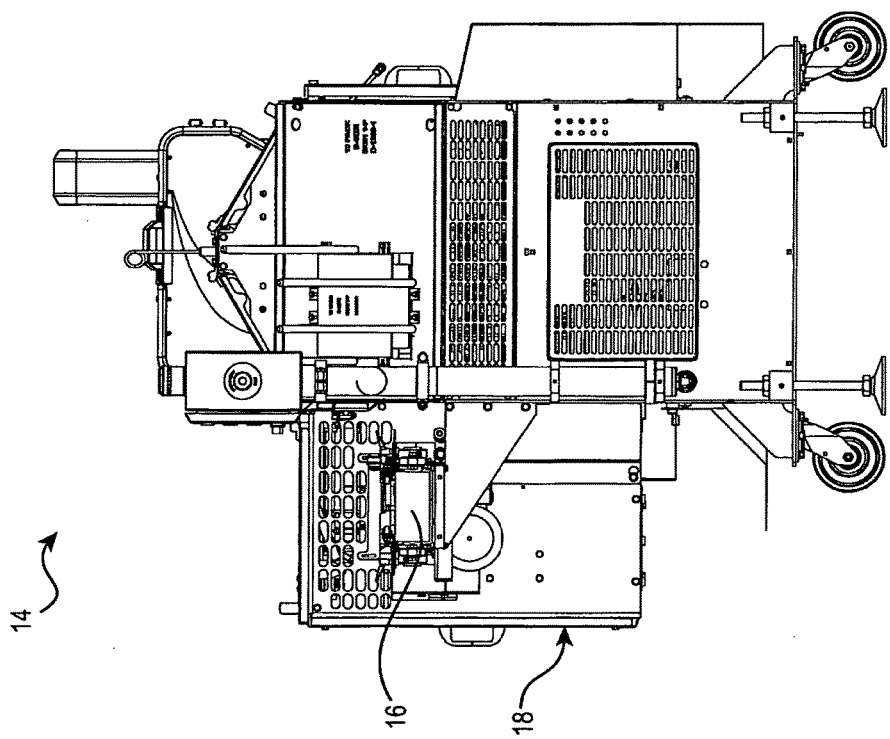
FIG. 10 is a right side elevational view of the ice cream sandwich making machine and cartoner shown in FIG. 7.
Figure 11:
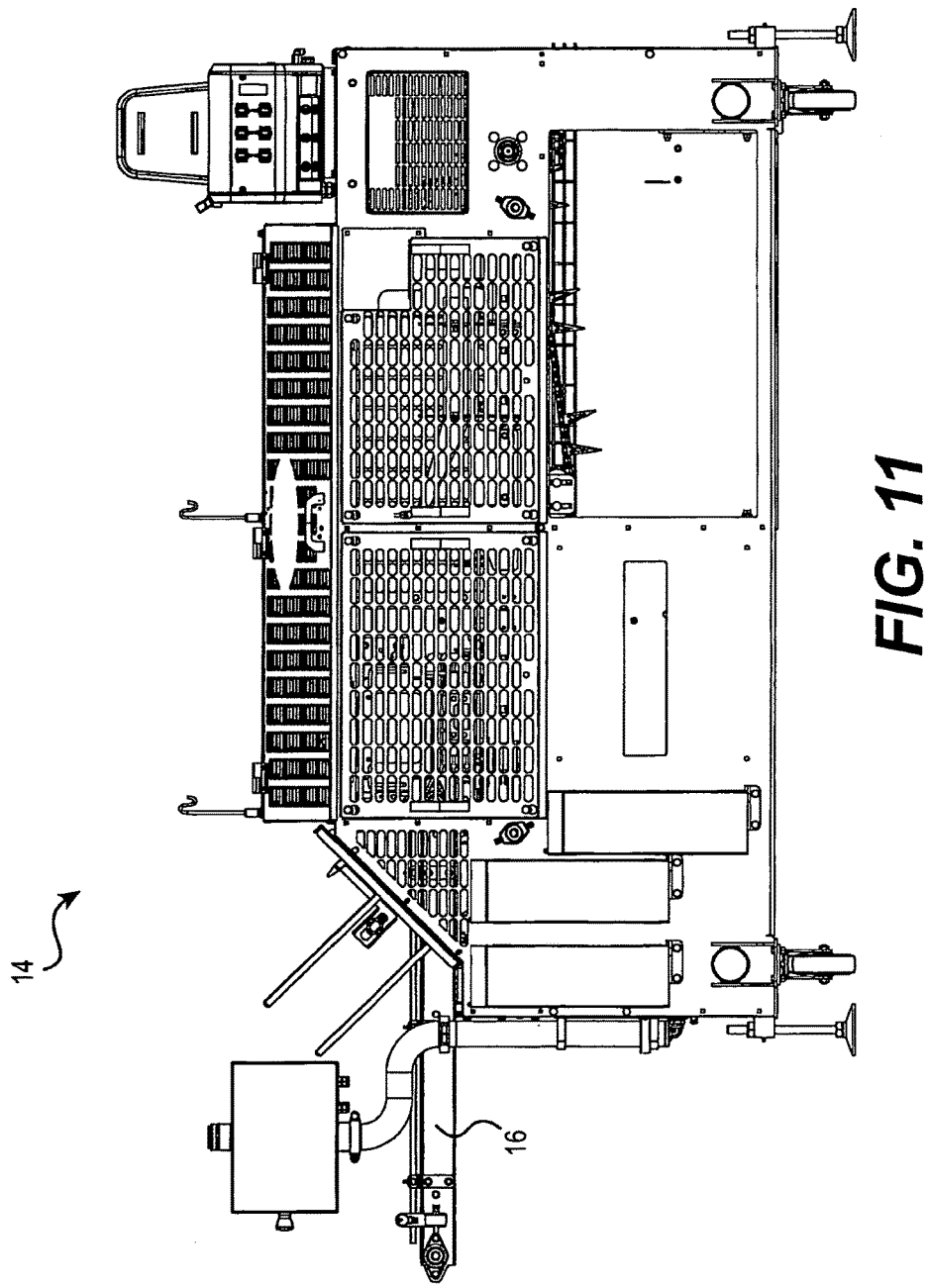
FIG. 11 is a rear elevational view of the ice cream sandwich making machine and cartoner shown in FIG. 7.
Figure 12:
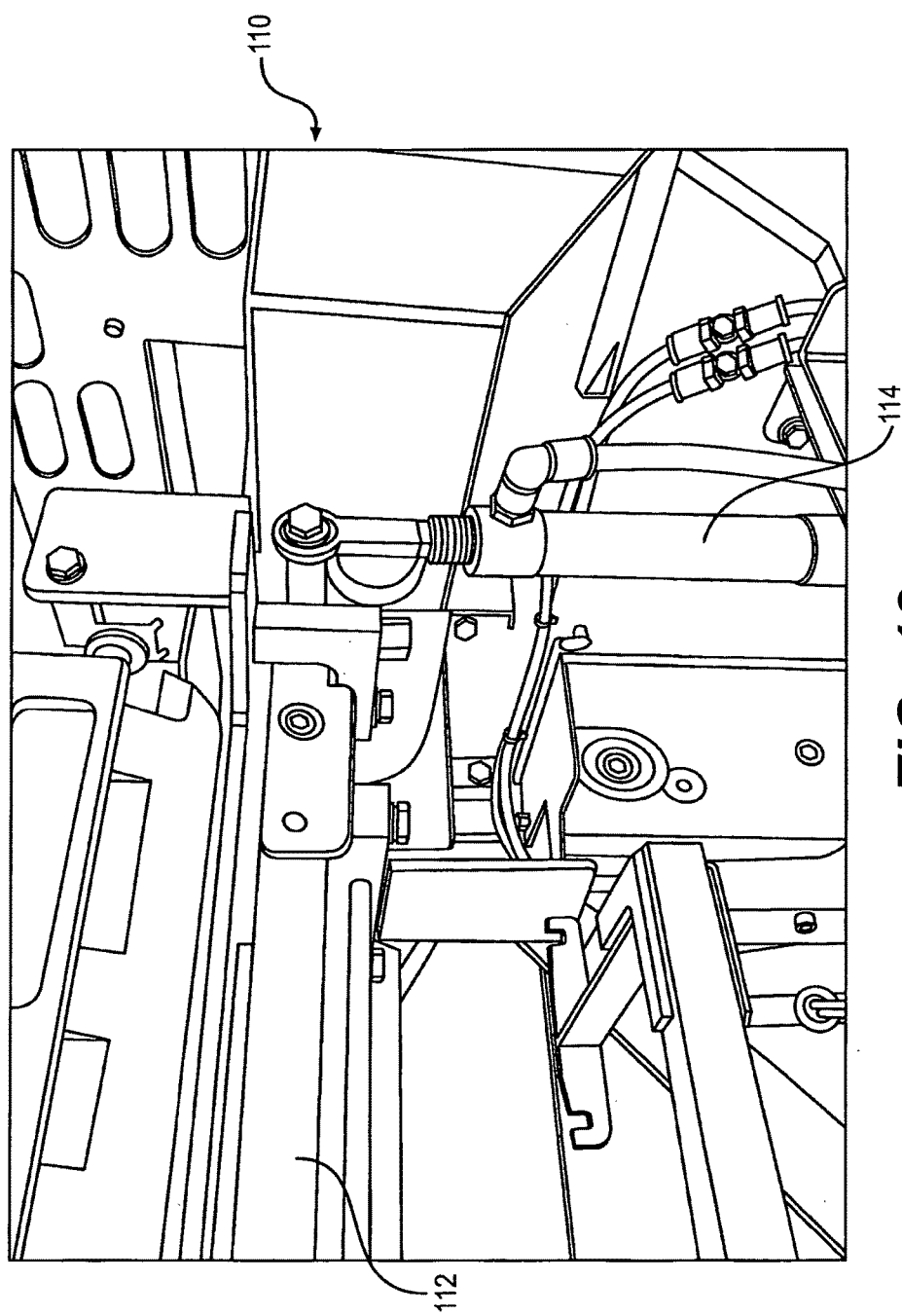
FIG. 12 is a broken away detailed view of a tilting dead plate in the lowered normal operation positioning.
Figure 13:
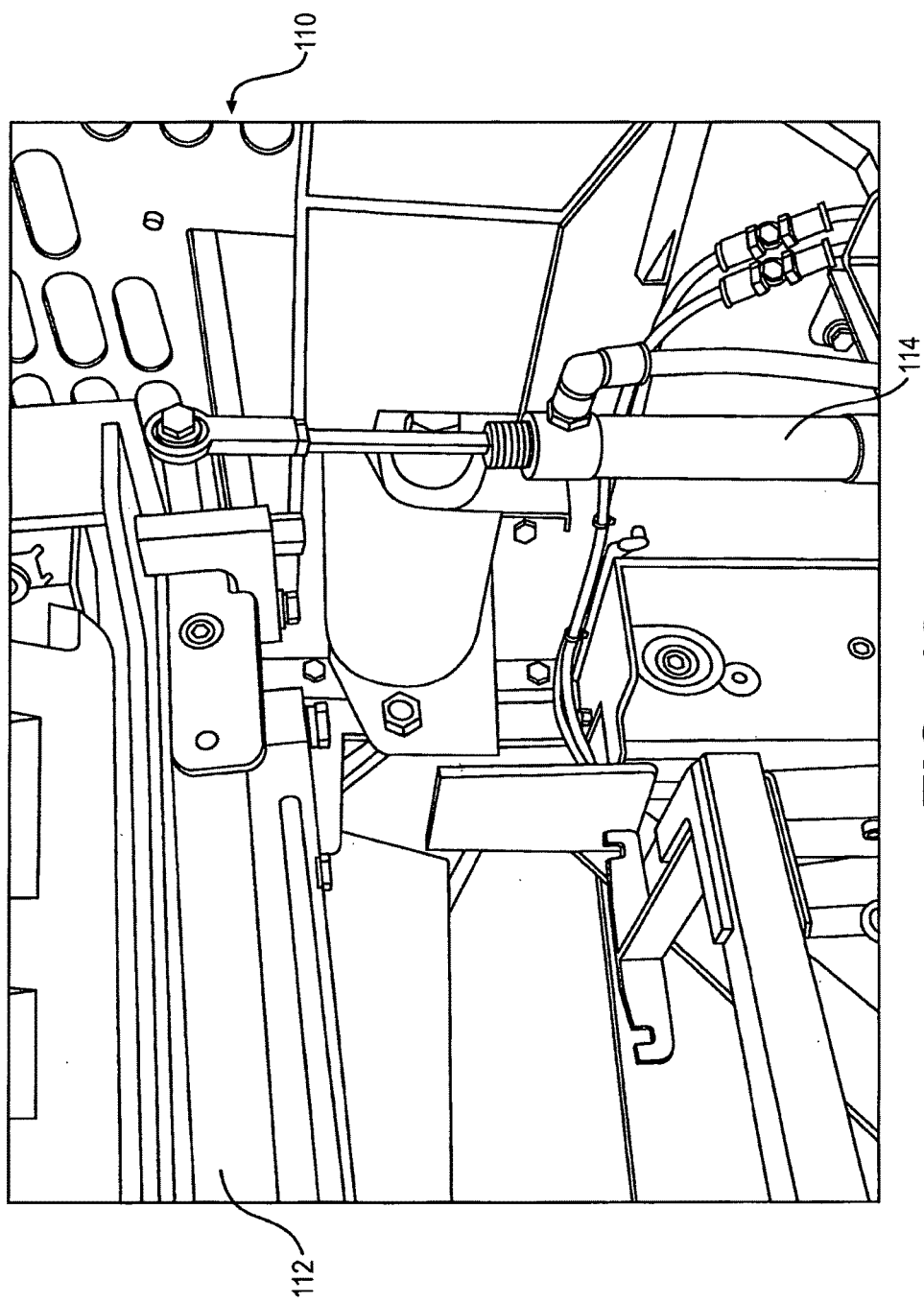
FIG. 13 is a broken away detailed view of the tilting dead plate in the raised diverting position.
Figure 14:
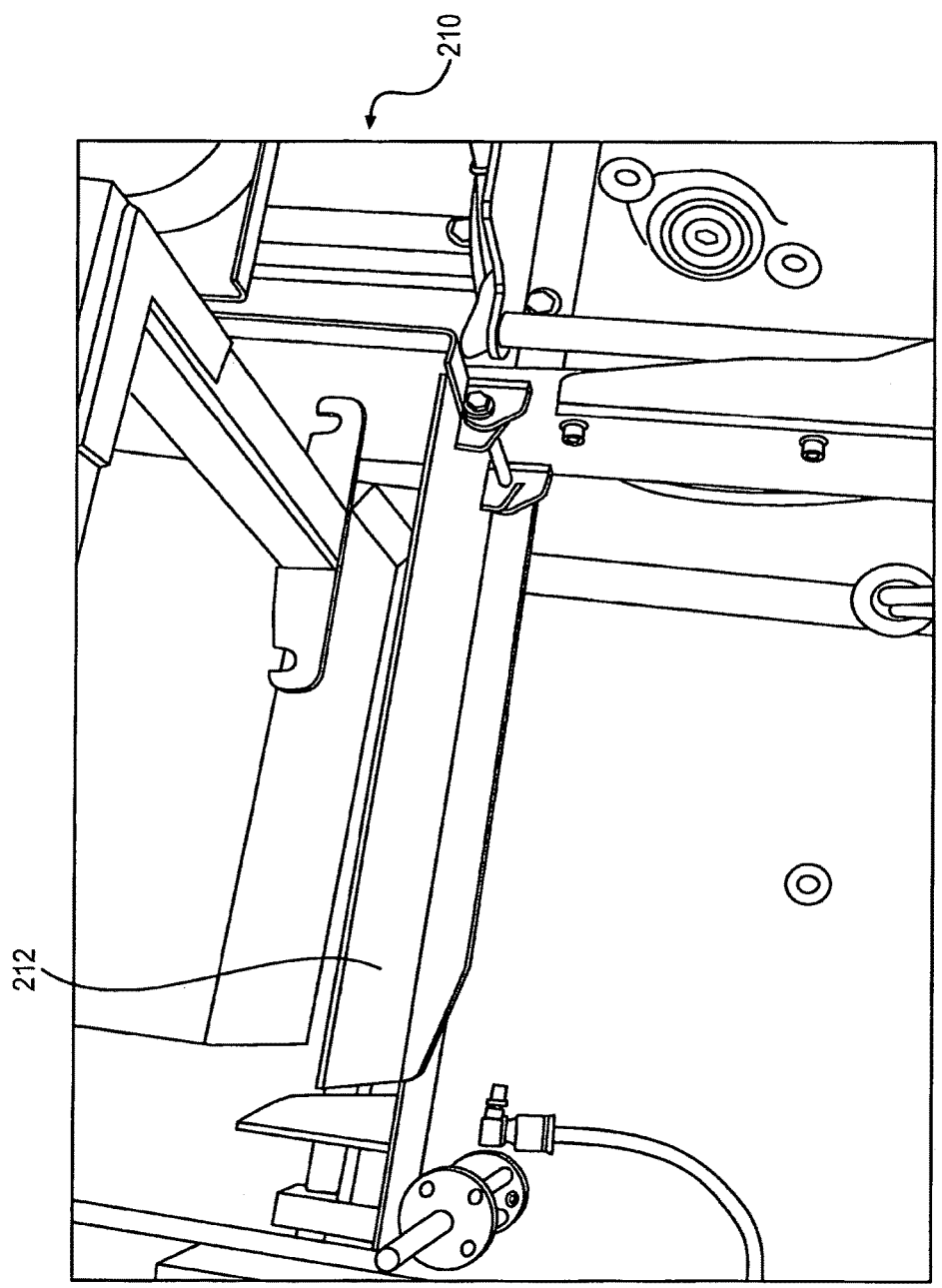
FIG. 14 is a broken away detailed view of the tilting stacking elevator pad in the normal level position.
Figure 15:
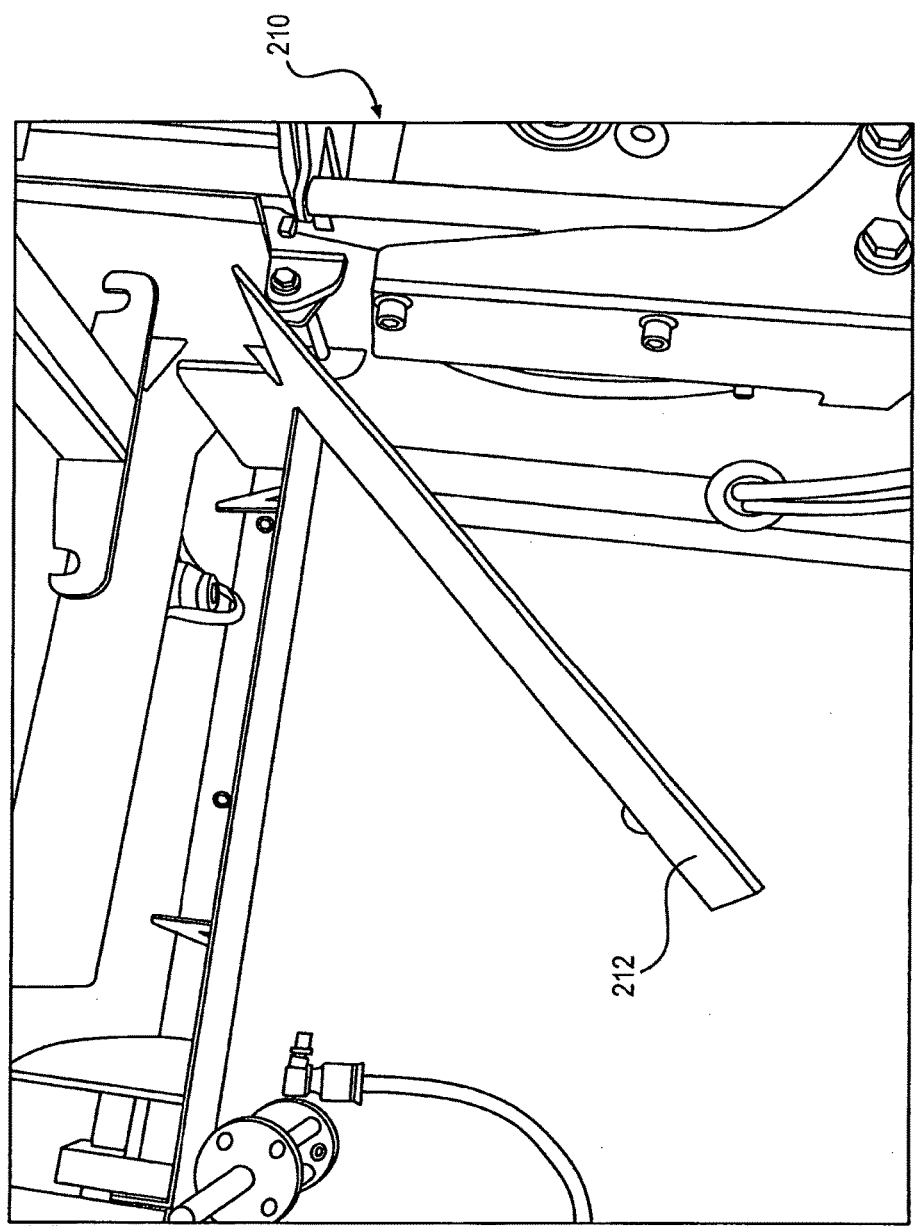
FIG. 15 is a broken away detailed view of the tilting stacking elevator pad in the titled position.

The ice cream sandwich cartoner 14 comprises a collation unit 18, as shown in FIG. 7. The collation unit 18 comprises an ice cream sandwich diverter 110 located within the collation unit 18, as shown in FIGS. 1.2, 13, 21, and 22.

The ice cream sandwich diverter 110 comprises a tilting dead-plate 112 positioned adjacent to and downstream relative to the conveyor 16 (FIG. 7). Specifically, the right end of the tilting dead-plate 112 is located adjacent to the left end of the conveyor 16. During operation, the conveyor 16 supplies wrapped ice cream sandwiches to the tilting dead-plate 112 located within the collation unit 18.

An actuator 114 (e.g. hydraulic, pneumatic, or electric actuator) is connected to the tilting dead-plate 112 to tilt an input end of the tilting dead-plate 112 upwardly to divert the ice cream sandwiches to bypass an accumulation area in the collation unit 18.

The ice cream sandwich diverter 110 can be configured to automatically or semi-automatically divert wrapped ice cream sandwiches in the collation unit 18. For example, one or more electronic controls are programmed to operate the ice cream sandwich diverter 110, or operated by a computer.

The tilting dead-plate 112 is located in an ice cream sandwich accumulation area, and is configured to tilt up allowing ice cream sandwiches moving on the conveyor 16 to bypass the accumulation area. This can be configured to operate automatically when the control system detects a jam, or manually by a selector switch. This reduces the time it takes to clear a jam in the collation unit 18 by at least partially self clearing the jam and the diverter allows the filler to keep operating. Thus, the operator does not have to manually clear the jam, and there is no need to stop/start the filler which causes waste and loss of time. Opening the door stops the cartoner; however, this does not emergency stop the ice cream making machine. The emergency stop will stop the infeed conveyor.

Stacking Elevator

Again, the ice cream sandwich cartoner 14 comprises a collation unit 18 (FIG. 7). An ice cream sandwich stacking elevator 210 is located within the collation unit 18, as shown in FIGS. 14, 15, 21, and 22.

The stacking elevator 210 comprises a tilting elevator pad 212. During an ice cream sandwich diverting operation, the tilting elevator pad 212 self clears by dropping from a horizontal loading position to a steep angle, which allows any accumulated sandwich to fall clear of the pad, and resets a new count. This also reduces the time it takes to clear a jam in the collation unit 18 by at least partially self clearing the jam and the diverter allows the filler to keep operating. Thus, the operator does not have to manually clear the jam, and there is no need to stop/start the filler which causes waste and loss of time. Opening the door stops the cartoner; however, this does not emergency stop the ice cream making machine. The emergency stop will stop the infeed conveyor.

Adjustable Fence Stop

Figure 16:
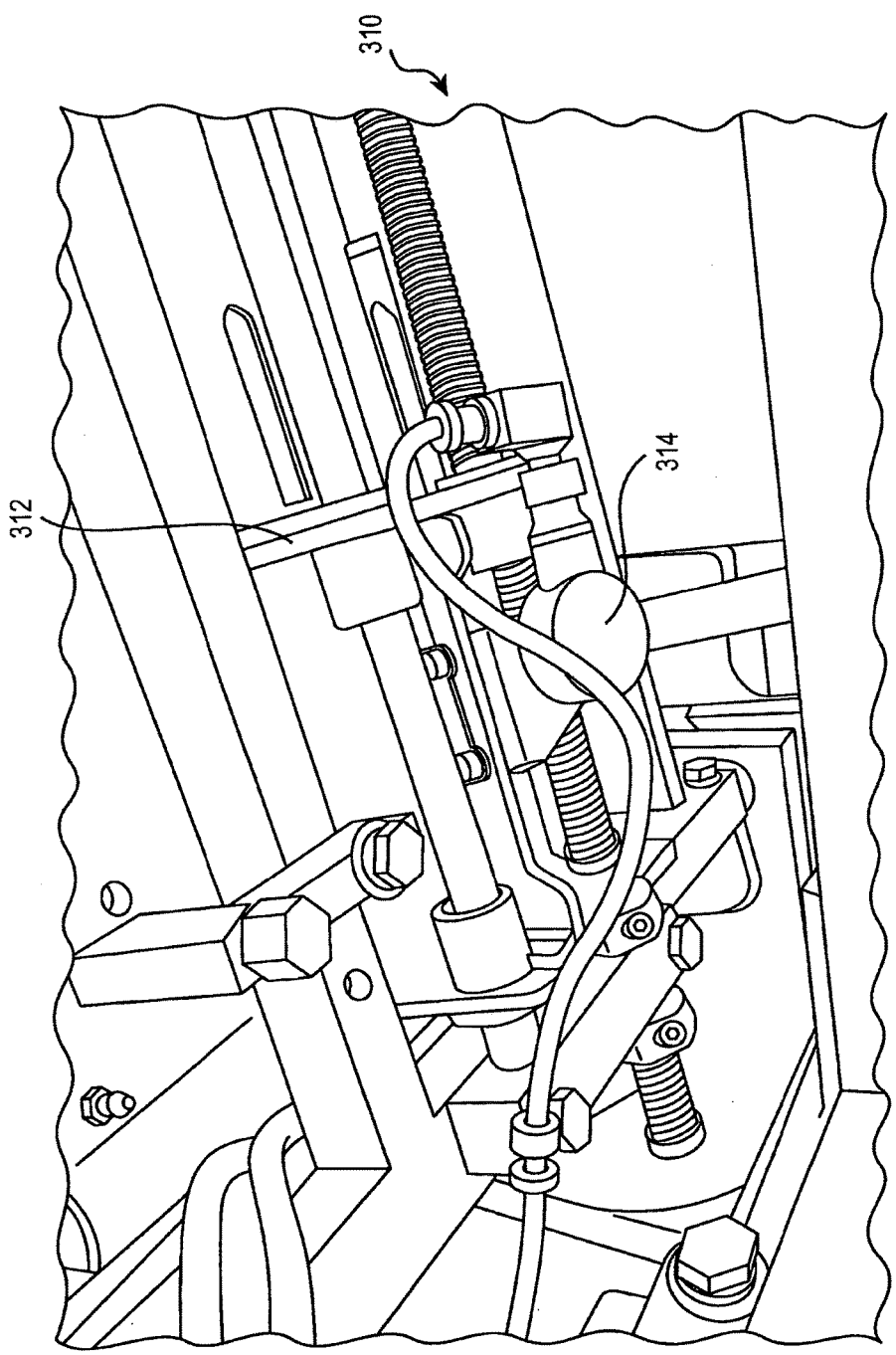
FIG. 16 is a broken away detailed view of the adjustable fence stop located in collation unit.
Figures 23, 24:
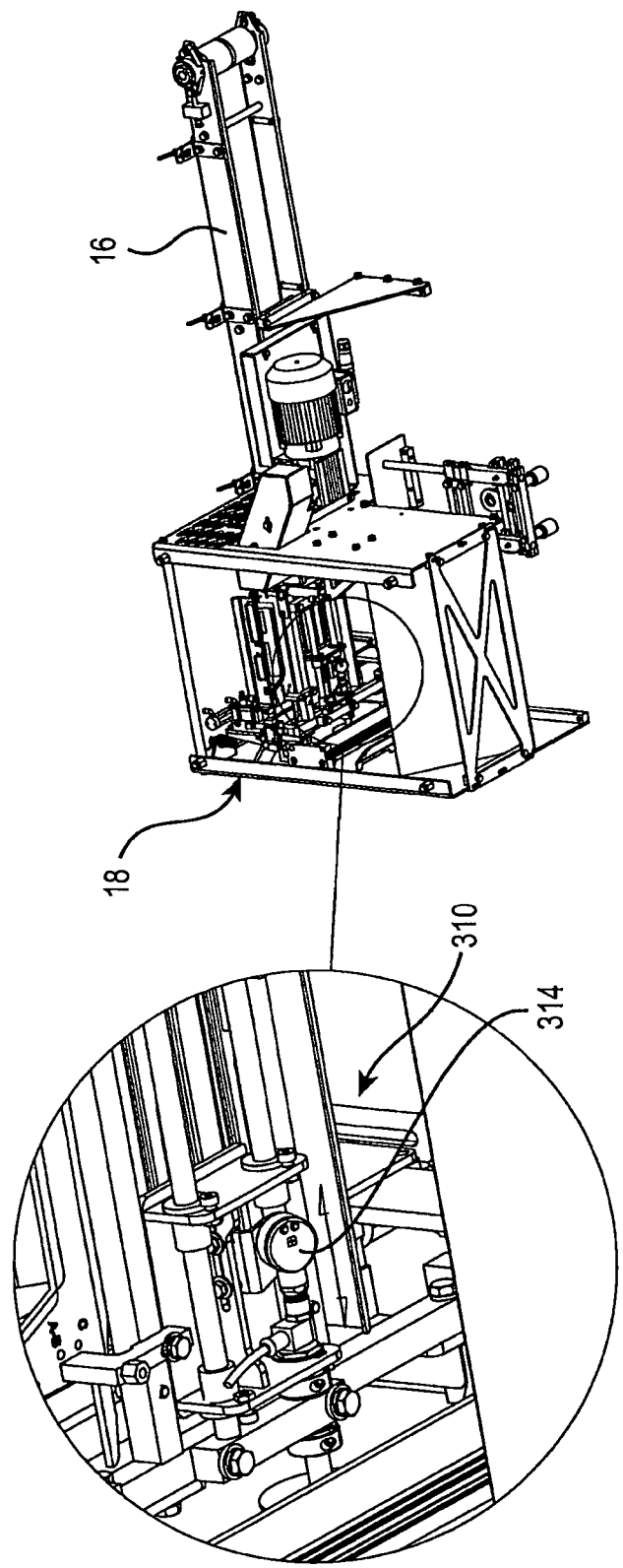
FIG. 23 is a front and bottom perspective view of the collation unit of the ice cream sandwich cartoner illustrating the location of the adjustable fence stop.
FIG. 24 is an exploded detailed view of the adjustable fence stop shown in FIG. 23.

An adjustable fence stop 310 is located within the collation unit 18 (FIG. 7) of the ice cream sandwich cartoner 14. The ice cream cartoner 14 is shown outside of a safety cage in FIGS. 16, 23, and 24.

This feature allows for fine tuning of the stop position for the wrapped ice cream sandwiches from outside the guarded area. Fine tune adjustments can be made during production without having to emergency stop the machine, which saves down time. The adjustable fence stop 310 comprises a stop bar 312 and detection sensor 314. The stop bar 312 and sandwich detection sensor 314 move as a single unit eliminating the need for individual adjustment.

Dual Speed Secondary Carton Load Pusher Arrangement

Figure 17:
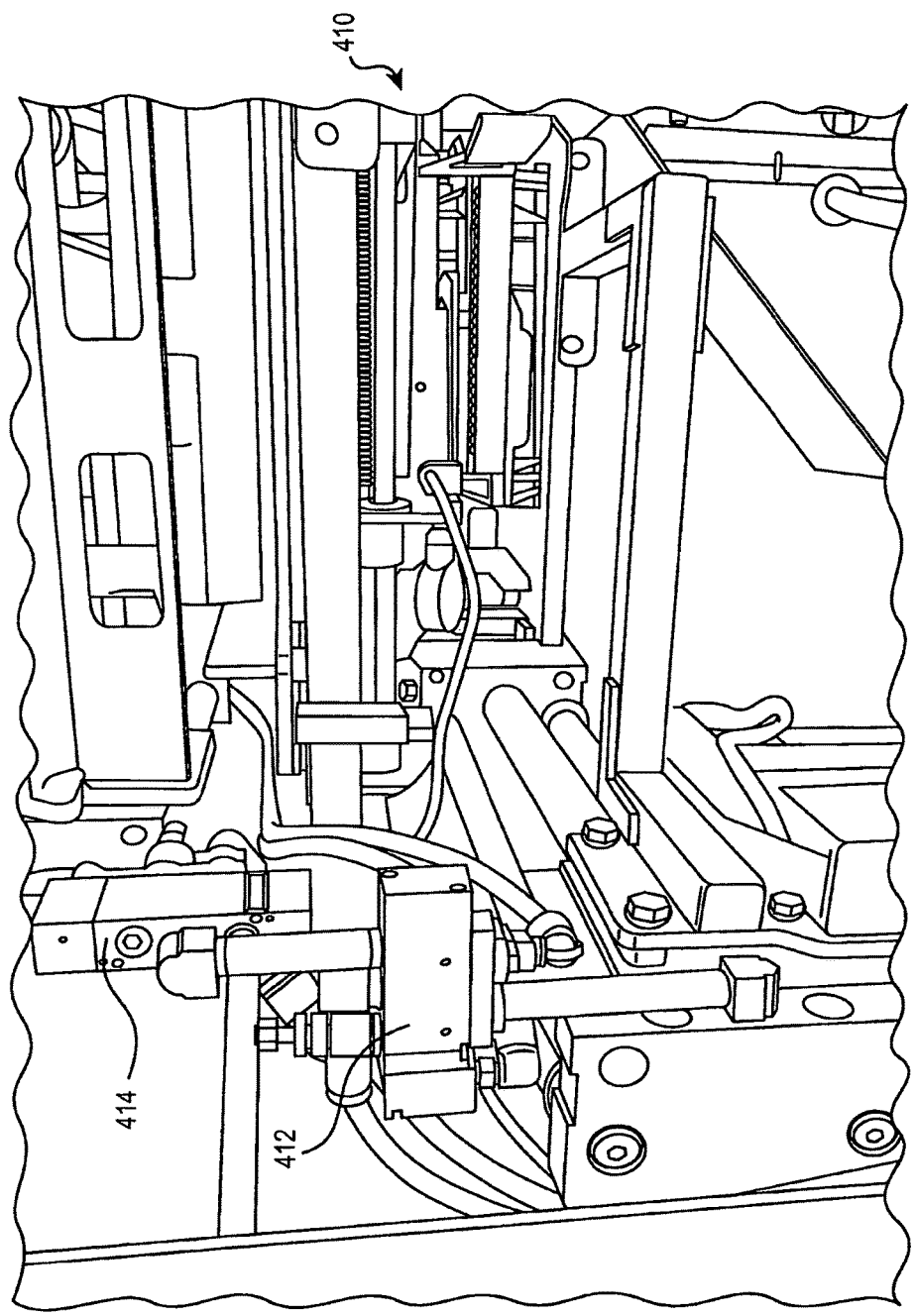
FIG. 17 is a broken away detailed view of the dual speed secondary carton load pusher.
Figure 25:
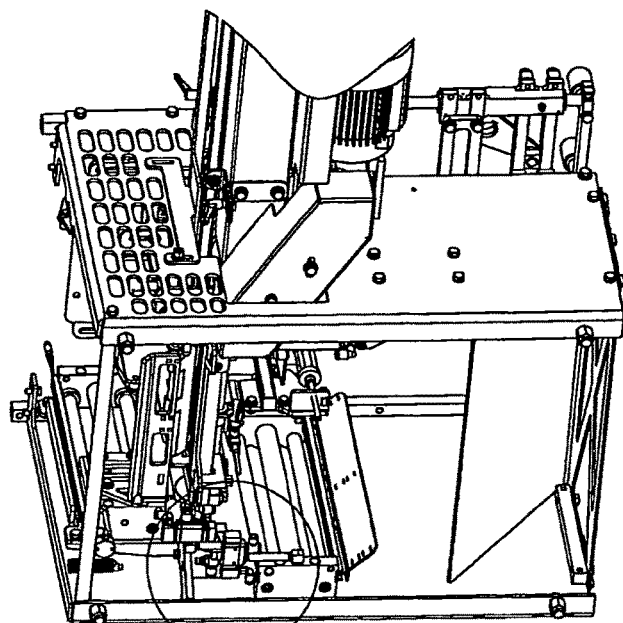
FIG. 25 is a front and side perspective view of the collation unit of the ice cream sandwich cartoner illustrating the dual speed secondary carton load pusher.
Figure 26:
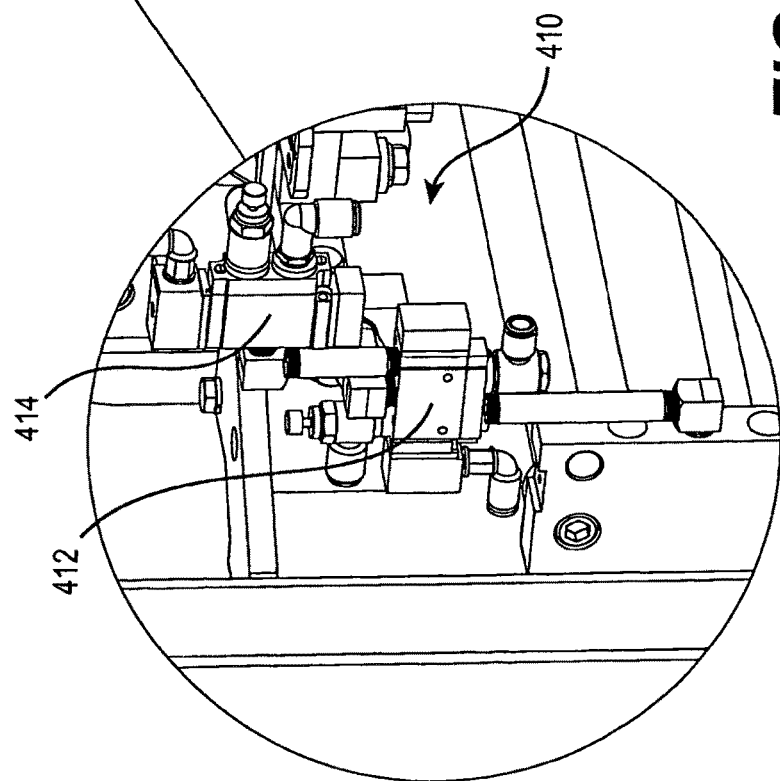
FIG. 26 is an exploded detailed view of the dual speed secondary carton load pusher shown in FIG. 25.

A dual speed carton load pusher arrangement 410 is located within the collation unit 18, as shown in FIGS. 17, 25, and 26.

The dual speed carton load pusher 410 comprises valves 412 and flow restrictors 414, which implement dual-speed pusher operation.

When loading a double-load box, the first load does not reach the far end of the carton, and may jumble, if loaded too quickly. The maximum speed of the cartoner 14 is then limited by the slow motion required for this action.

The cartoner 14 is equipped with the valves 412 (i.e. valving) that allows high speed motion normally when loading the second group of ice cream sandwiches, and low speed motion only when loading the first group of ice cream sandwiches into a double load box. This allows the machine to run at higher cycle speeds without jumbling the first load of sandwiches in a dual load carton. It is accomplished by passing exhaust air on a secondary pusher through a restrictor on a dual load carton during the first load. The second load by-passes the restrictor allowing the pusher to move at a higher rate of speed. This reduces operator/service adjustments and errors, and provides the fastest possible speed without manual adjustment.

Recipe Driven Carton Flight Drive Arrangement

Figure 18:
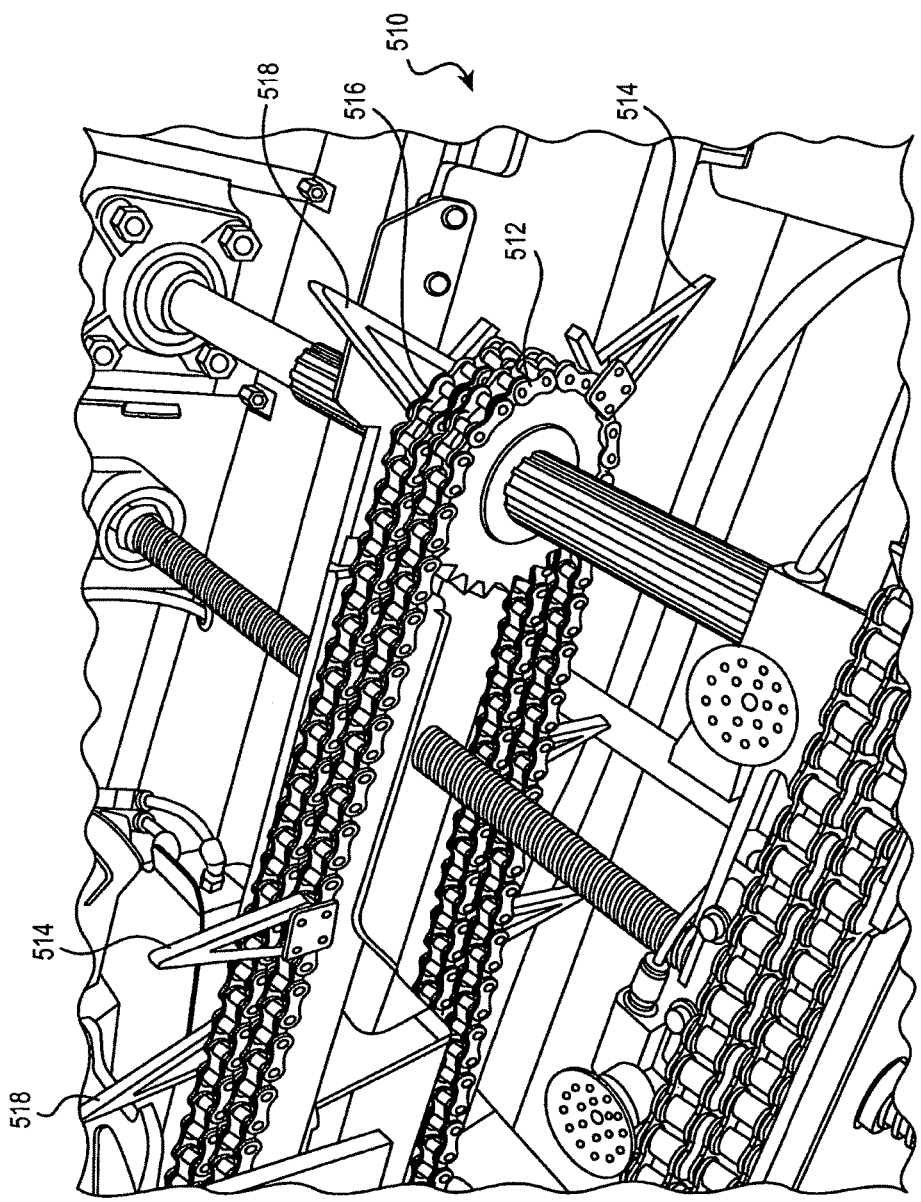
FIG. 18 is a broken away detailed view of the recipe driven carton flight drive spacing arrangement.

A recipe driven carton flight drive arrangement 510 is located on the cartoner 14, and shown in FIGS. 18, 27, 28.

The recipe driven carton flight drive 510 comprises adjustable spacing lugs 514, 518 to accommodate different sized cartons.

Specifically, a first drive chain 512 is provided with a set of spaced apart lugs 514 and a second drive chain 516 is provided with spaced apart lugs 518.

The recipe driven carton flight drive 510 is configured to allow different sized cartons to run in the Human Machine Interface (HMI), and the lugs 514, 518 automatically adjust to the size of the carton. This is accomplished by using two (2) servo motors, one drives the leading lugs and the other drives the trailing lugs. This arrangement reduces the change-over time when changing carton sizes, and results in an exact setup consistently.

TELESCOPING CARTON PICK ARM

Figure 19:
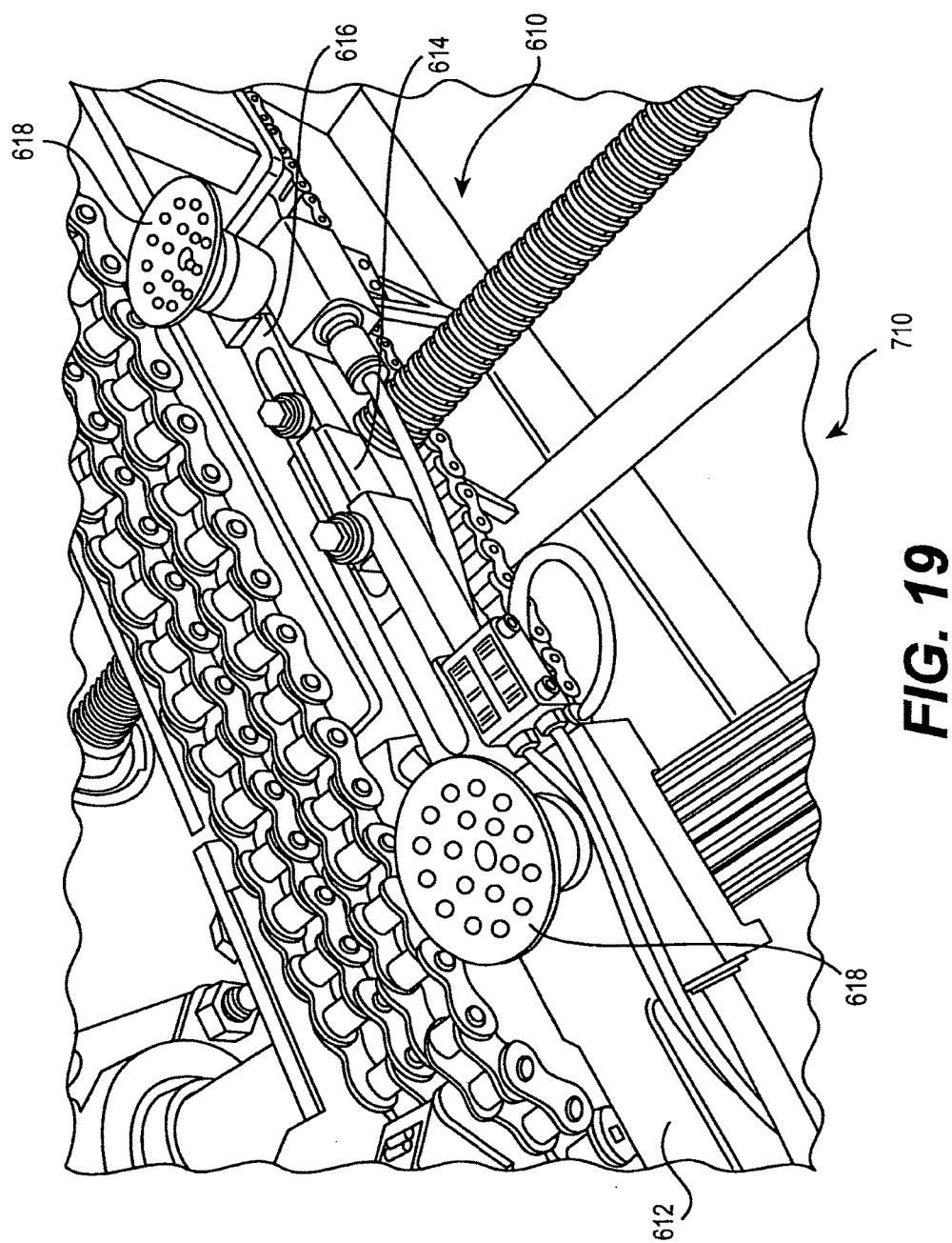
FIG. 19 is a broken away detailed view of the telescoping carton pick arm.

A telescoping carton pick arm arrangement 610 is located on the cartoner 14, and shown in FIG. 19.

The telescoping carton pick arm arrangement 610 comprises a telescoping pick arms 612 comprising adjustable length arm extensions 614, 616, and a set of vacuum cups 618. This configuration allows the use of one arm for various carton sizes. This allows the vacuum cups 618 to be optimally located without the need for change parts, which reduces costs and change-over time.

Recipe Driven Double-Motion Carton Pick Arm

The recipe driven double-motion carton pick arm arrangement 710 is located on the cartoner 14, and shown in FIG. 19. The recipe driven double-motion pick arm arrangement 710 is combined with the telescoping carton pick arm arrangement 610.

The recipe driven double-motion carton pick arm arrangement 710 is configured to handle large cartons that are difficult to erect. This arrangement can be setup in the Human Machine Interface (HMI) to automatically pull the carton from supports provided in the carton magazine a small amount, and then reverse to near the starting position to relax the pull on the carton, followed by movement to a final position. This ensures that large cartons are opened reliably and improves the machine efficiency.

Serrated Drive Lugs

Figure 20:
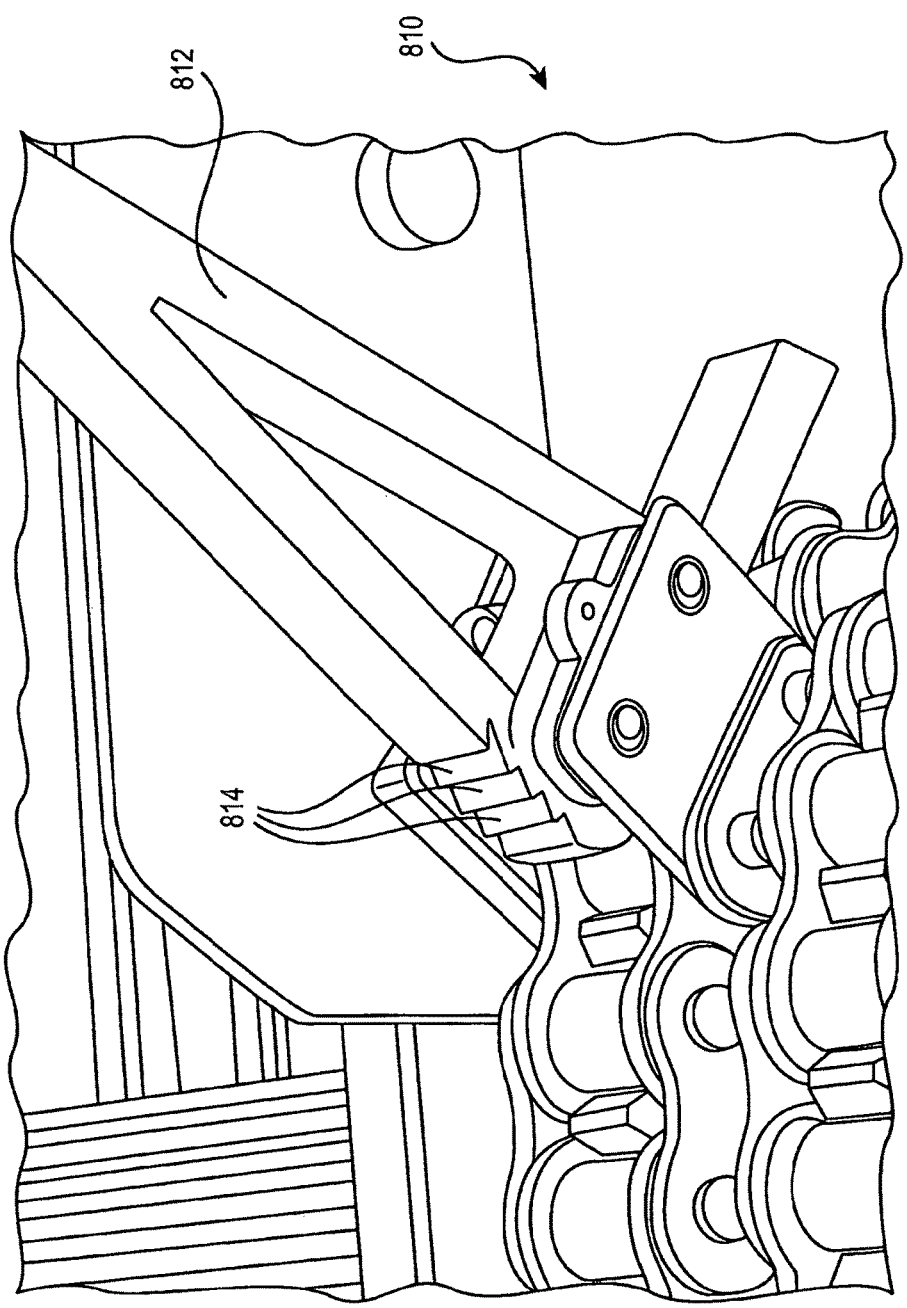
FIG. 20 is a broken away detailed view of the serrated drive lugs.
Figure 22:
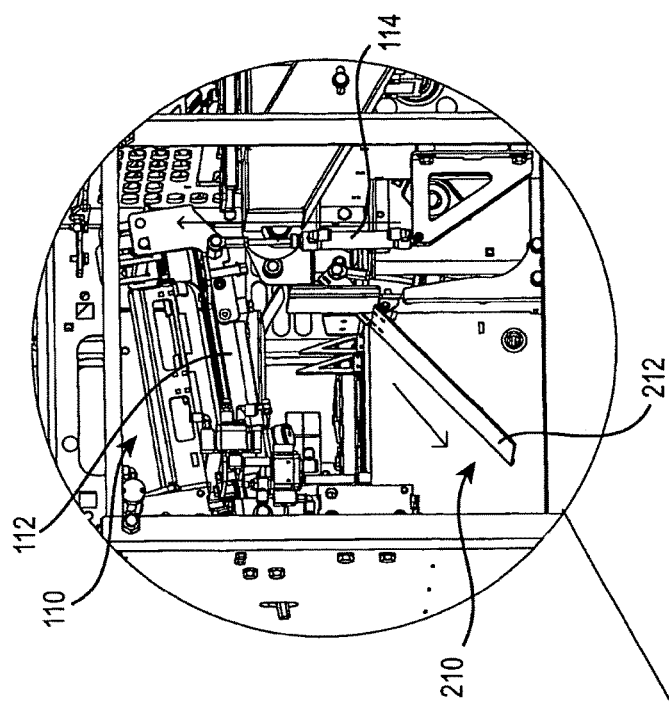
FIG. 22 is an exploded detailed view of the tilting dead plate and tilting stacking elevator pad shown in FIG. 21.
Figure 21:
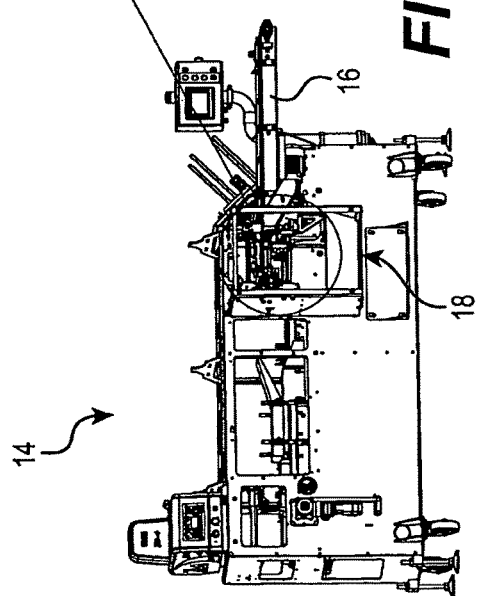
FIG. 21 is a front elevational view of the ice cream sandwich cartoner illustrating the location of the tilting dead plate and tilting stacking elevator pad on the ice cream cartoner.

The serrated drive lug arrangement 810 is located on the cartoner 14, and shown in FIG. 20.

The serrated drive lugs 812 each comprise a set of teeth 814 configured to keep a carton from moving out of placed position during index as the drive lugs advance a carton from an erected position to a carton loading position. This lug arrangement improves machine efficiency.

We claim:

1. An ice cream sandwich cartoner, comprising:
   a collation unit that provides an accumulation area for wrapped ice cream sandwiches;
   a conveyor belt for receiving and conveying the wrapped ice cream sandwiches to the accumulation area;
   a diverter including a dead plate having an input end positioned adjacent to an output end of the conveyor belt, and an actuator operable to raise the input end relative to the output end such that the wrapped ice cream sandwiches fall downwardly from the output end and thereby by-pass the accumulation area;
   a tilting elevator pad arranged to receive the wrapped ice cream sandwiches and operable to drop from a horizontal loading position to a steep angle when a jam is detected and thereby clear accumulated wrapped ice cream sandwiches; and
   a control configured to detect the jam and operate at least one of the actuator and the tilting elevator pad to clear the jam.

2. The cartoner according to claim 1, wherein the dead plate is located between the conveyor belt and the accumulation area.

3. The cartoner according to claim 1, wherein the tilting elevator pad is located below and at a predetermined distance from the output end of the conveyor belt.

4. The cartoner according to claim 1, wherein the control is configured to automatically or semi-automatically control at least one of the actuator and the tilting elevator pad.

5. The cartoner according to claim 1, wherein the diverter is configured to reduce time it takes to clear the jam in the collation unit by reducing a need to open interlocked doors which emergency stops an ice cream sandwich making machine and cartoner.

6. The cartoner according to claim 1, wherein the control is an electronic control unit.

7. The cartoner according to claim 1, wherein the tilting elevator pad forms part of a stacking elevator included in the collation unit.

8. The cartoner according to claim 7, wherein the tilting elevator pad reduces a time required to clear the jam in the collation unit by reducing a need to open interlocked doors which emergency stops an ice cream sandwich making machine and the cartoner.

9. The cartoner according to claim 1, further comprising a dual speed carton load pusher located within the collation unit and configured for low speed motion when loading a first load of wrapped ice cream sandwiches into a double-load box and high speed motion when loading a second load of wrapped ice cream sandwiches into the double-load box.

10. The cartoner according to claim 9, wherein the dual speed secondary carton load pusher includes one or more valves and a flow restrictor that pass exhaust air when loading the first load of wrapped ice cream sandwiches into the double-load box.

11. The cartoner according to claim 10, wherein pressurized air in the dual speed secondary carton load pusher bypasses the one or more valves and the flow restrictor when loading the second load of wrapped ice cream sandwiches into the double-load box.

12. The cartoner according to claim 1, wherein dropping the tilting elevator pad from the horizontal loading position to the steep angle resets a count of wrapped ice cream sandwiches.

13. An ice cream sandwich cartoner, comprising:
a collation unit that provides an accumulation area for wrapped ice cream sandwiches;
a conveyor belt for receiving and conveying the wrapped ice cream sandwiches to the accumulation area;
a diverter including a dead plate having an input end positioned adjacent to an output end of the conveyor belt, and an actuator operable to raise the input end relative to the output end such that the wrapped ice cream sandwiches fall downwardly from the output end and thereby by-pass the accumulation area;
a tilting elevator pad arranged to receive the wrapped ice cream sandwiches and operable to drop from a horizontal loading position to a steep angle when a jam is detected and thereby clear accumulated wrapped ice cream sandwiches;
a dual speed secondary carton load pusher located within the collation unit and configured for low speed motion when loading a first load of wrapped ice cream sandwiches into a double-load box and high speed motion when loading a second load of wrapped ice cream sandwiches into the double-load box; and
a control configured to detect the jam and operate at least one of the actuator and the tilting elevator pad to clear the jam.

14. The cartoner according to claim 13, wherein dropping the tilting elevator pad from the horizontal loading position to the steep angle resets a count of wrapped ice cream sandwiches.

15. The cartoner according to claim 13, wherein the control automatically or semi-automatically controls at least one of the actuator and the tilting elevator pad.

16. The cartoner according to claim 13, wherein the dual speed secondary carton load pusher includes one or more valves and a flow restrictor that pass exhaust air when loading the first load of wrapped ice cream sandwiches into the double-load box.

17. The cartoner according to claim 16, wherein pressurized air in the dual speed secondary carton load pusher bypasses the one or more valves and the flow restrictor when loading the second load of wrapped ice cream sandwiches into the double-load box.

* * * * *